US009593719B2

(12) United States Patent
Ban et al.

(10) Patent No.: US 9,593,719 B2
(45) Date of Patent: Mar. 14, 2017

(54) DOUBLE-ROW ROLLER BEARING

(71) Applicant: THK CO., LTD., Tokyo (JP)

(72) Inventors: Toshikazu Ban, Tokyo (JP); Tomozumi Murata, Tokyo (JP); Hirotake Kobayashi, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 14/892,341

(22) PCT Filed: May 12, 2014

(86) PCT No.: PCT/JP2014/062596
§ 371 (c)(1),
(2) Date: Nov. 19, 2015

(87) PCT Pub. No.: WO2014/188900
PCT Pub. Date: Nov. 27, 2014

(65) Prior Publication Data
US 2016/0084312 A1    Mar. 24, 2016

(30) Foreign Application Priority Data

May 20, 2013  (JP) .................................. 2013-106323
Aug. 22, 2013  (JP) .................................. 2013-172520

(51) Int. Cl.
*F16C 33/58*  (2006.01)
*F16C 19/38*  (2006.01)
(Continued)

(52) U.S. Cl.
CPC ............ *F16C 33/585* (2013.01); *F16C 19/38* (2013.01); *F16C 33/60* (2013.01);
(Continued)

(58) Field of Classification Search
CPC ...... F16C 19/362; F16C 19/381; F16C 19/54; F16C 33/58; F16C 33/585; F16C 33/6659;
(Continued)

(56) References Cited

U.S. PATENT DOCUMENTS 3,258,301 A * 6/1966 Porvatov ................. B66C 23/84
384/454
3,302,986 A * 2/1967 Grolman ............... F16C 19/381
384/452

(Continued)

FOREIGN PATENT DOCUMENTS

JP  59-177825 U  11/1984
JP  63-139324 U   9/1988
(Continued)

OTHER PUBLICATIONS

International Search Report dated Jul. 22, 2014, issued in counterpart Application No. PCT/JP2014/062596 (2 pages).

*Primary Examiner* — Marcus Charles
(74) *Attorney, Agent, or Firm* — Westerman, Hattori, Daniels & Adrian, LLP

(57) ABSTRACT

Provided is a double-row roller bearing, which is capable of suppressing a frictional force from being increased due to variation in force of press contact between outer and inner rings and rollers to enable smoother relative rotational movement between the outer ring and the inner ring, and is also suitable for downsizing and higher in versatility.

7 Claims, 5 Drawing Sheets

(51) Int. Cl.
*F16C 33/60* (2006.01)
*F16C 33/78* (2006.01)
*F16C 33/66* (2006.01)

(52) U.S. Cl.
CPC ...... *F16C 33/6662* (2013.01); *F16C 33/6685* (2013.01); *F16C 33/7886* (2013.01); *F16C 2240/46* (2013.01)

(58) Field of Classification Search
CPC .. F16C 43/06; F16C 2240/46; F16C 2300/14; F16C 33/6614; F16C 33/6629; F16C 33/6685; F16C 33/7886; F16F 33/54; B66C 23/84; Y10T 29/49682
USPC ....... 384/455, 462, 565, 570, 585, 592, 593, 384/606, 618, 622, 564, 569, 619
See application file for complete search history.

(56) References Cited

U.S. PATENT DOCUMENTS

| | | | | |
|---|---|---|---|---|
| 3,967,867 | A * | 7/1976 | Richardson | B66C 23/84 384/582 |
| 4,223,961 | A * | 9/1980 | Martinez | F16C 19/49 384/452 |
| 4,248,488 | A * | 2/1981 | Sable | B66C 23/84 212/181 |
| 4,395,140 | A * | 7/1983 | Sable | B66C 23/84 384/593 |
| 4,417,773 | A * | 11/1983 | Becker | B66C 23/84 384/504 |
| 5,167,590 | A * | 12/1992 | Kratochvil | F16H 1/32 475/178 |
| 8,002,472 | B2 * | 8/2011 | Craig | F16C 19/52 384/455 |
| 8,540,092 | B2 * | 9/2013 | Roodenburg | F16C 33/60 384/455 |
| 2003/0048963 | A1 * | 3/2003 | Jacquemont | F16C 33/6607 384/462 |
| 2013/0343685 | A1 | 12/2013 | Nagengast et al. | |

FOREIGN PATENT DOCUMENTS

| | | |
|---|---|---|
| JP | 2008-542650 A | 11/2008 |
| JP | 2010-261482 A | 11/2010 |
| JP | 2011-106544 A | 6/2011 |
| WO | 2006/131301 A2 | 12/2006 |
| WO | 2012/123239 A1 | 9/2012 |

* cited by examiner

DOUBLE-ROW ROLLER BEARING

TECHNICAL FIELD

The present invention relates to a double-row roller bearing to be used at a turning part of, for example, various machine tools, in which rolling passages for rollers are formed in double rows between an inner ring and an outer ring.

BACKGROUND ART

A roller bearing disclosed in Patent Literature 1 has been known as a roller bearing capable of bearing both axial loads applied in a direction parallel to a rotation axis of an inner ring and an outer ring, and radial loads applied in a direction orthogonal to the rotation axis. In this roller bearing, rolling passages for rollers are formed between the outer ring and the inner ring along a circumferential direction of the roller bearing, and the rollers are revolved while turning on their axes in the rolling passages along with relative rotational movement between the outer ring and the inner ring.

Specifically, in the roller bearing illustrated in FIG. 5 of Patent Literature 1, two raceway grooves each having a V-shape in cross-section are formed in an inner peripheral surface of the outer ring, whereas two raceway grooves each having a V-shape in cross-section are formed also in an outer peripheral surface of the inner ring. Those raceway grooves face each other so that the pair of rolling passages is formed between the outer ring and the inner ring. The turning axes of the rollers arrayed in each of the rolling passages are inclined at an angle of 45° with respect to the rotation axis of the inner ring and the outer ring. Further, turning axes of the rollers arrayed in one of the rolling passages and turning axes of the rollers arrayed in another one of the rolling passages are orthogonal to each other. With this, the rollers arrayed in the rolling passages are each capable of bearing both the axial load and the radial load.

However, in the roller bearing as illustrated in FIG. 5 of Patent Literature 1, the turning axes of the rollers are inclined with respect to the rotation axis of the inner ring and the outer ring, and hence the rollers differentially slide when the rollers roll between the outer ring and the inner ring. Thus, frictional heat is generated between the rollers and the raceway grooves in use of the roller bearing, with the result that the inner ring and the outer ring are thermally expanded. In this case, the outer ring and the inner ring are each formed into an annular shape, and hence diameters of the outer ring and the inner ring are increased due to the thermal expansion. This phenomenon more conspicuously occurs as the diameters of the outer ring and the inner ring are larger. Note that, although thicknesses of the outer ring and the inner ring are also increased due to the thermal expansion, the increase in thickness is significantly smaller than the increase in diameter because the thicknesses of the outer ring and the inner ring are smaller than circumferential lengths of the outer ring and the inner ring.

In many cases, the roller bearings as described above are used under a state in which an outer peripheral surface of the outer ring is covered with a housing of, for example, a mechanical device, whereas the inner ring is fixed to a rotation shaft. In such cases, deformation of the outer ring in a radial direction is suppressed by the housing, but the inner ring is thermally expanded toward the outer ring suppressed from being displaced in the radial direction. As a result, a force of press contact between the outer and inner rings and the rollers are increased. Thus, frictional heat to be generated between the rollers and the outer and inner rings is increased, which causes such a vicious cycle that additional thermal expansion of the inner ring and the outer ring occurs to excessively increase the force of the press contact between the outer and inner rings and the rollers. In this way, there arises a problem in that smooth rotational movement between the inner ring and the outer ring is hindered.

Meanwhile, in the roller bearing illustrated in FIG. 2 of Patent Literature 1, the turning axes of the rollers are not inclined with respect to the rotation axis of the outer ring and the inner ring. A rolling passage in which rollers configured to bear only the axial loads are arrayed, and a rolling passage in which rollers configured to bear only the radial loads are arrayed are formed independently of each other.

However, in the roller bearing constructed as described above, in order to prevent separation of the outer ring from the inner ring, two rolling passages in which the rollers configured to bear only the axial loads are arrayed need to be formed. As a result, three rolling passages for rollers need to be formed, and hence the thickness of the outer ring needs to be set larger, which is inappropriate in downsizing double-row roller bearings. In addition, the roller bearing has the two rolling passages in which the rollers configured to bear only the axial loads are arrayed, and thus the roller bearing is intended mainly to bear the axial loads. In view of this, it is hard to say that versatility is high.

CITATION LIST

Patent Literature

[PTL 1] JP 2008-542650 A

DISCLOSURE OF THE INVENTION

Problem to be Solved by the Invention

The present invention has been made to solve such problems, and has an object to provide a double-row roller bearing, which is capable of suppressing a frictional force from being increased due to variation in force of press contact between outer and inner rings and rollers to enable smoother relative rotational movement between the outer ring and the inner ring, and is also suitable for downsizing and higher in versatility.

Means for Solving the Problems

Specifically, a double-row roller bearing includes: an inner ring; an outer ring; and a plurality of rollers arranged between the inner ring and the outer ring. On one of an inner peripheral surface of the outer ring and an outer peripheral surface of the inner ring, one of the outer ring and the inner ring includes a pair of lateral protruding portions continuous along a circumferential direction of the inner ring or the outer ring, which are formed at an interval in a direction of a rotation axis of the inner ring or the outer ring. On another one of the inner peripheral surface of the outer ring and the outer peripheral surface of the inner ring, another one of the outer ring and the inner ring includes an intermediate protruding portion continuous along the circumferential direction, which is formed so as to be positioned between the pair of lateral protruding portions. The pair of lateral protruding portions and the intermediate protruding portion define a pair of roller rolling passages between the outer ring and the inner ring. Further, both lateral surfaces of the intermediate protruding portion and inner surfaces of the pair of lateral protruding portions, which face both the lateral surfaces of the intermediate protruding portion, include first rolling surfaces formed perpendicularly to the rotation axis of the outer ring and the inner ring. The inner peripheral surface of the outer ring and the outer peripheral surface of the inner ring include second rolling surfaces formed in parallel to the rotation axis so as to intersect with the first rolling surfaces. Respectively along the outer ring and the inner ring, the first rolling surfaces and the second rolling surfaces define raceway grooves each having an L-shape in cross-section and facing each other to form the pair of roller rolling passages. Further, the plurality of rollers include: rollers configured to roll on the first rolling surfaces; and rollers configured to roll on the second rolling surfaces, the rollers and the rollers being arranged in a mixed manner in each of the pair of roller rolling passages.

Effects of the Invention

In the present invention, the second rolling surfaces are formed parallel to the rotation axis of the inner ring and the outer ring. With this, even when a force of press contact between the second rolling surfaces and the rollers configured to roll on the second rolling surfaces is increased due to thermal expansion of the inner ring and the outer ring, the rollers do not differentially slide. Thus, frictional heat to be generated between the rollers and the second rolling surfaces is small. Meanwhile, the first rolling surfaces are formed perpendicularly to the rotation axis of the inner ring and the outer ring. Thus, even when the inner ring and the outer ring are expanded, a force of press contact between the first rolling surfaces and the rollers configured to roll on the first rolling surfaces does not vary. Thus, frictional heat to be generated between the rollers and the first rolling surfaces is not significantly increased. As a result, increase in temperature of the inner ring and the outer ring can be prevented, thereby being capable of achieving smoother relative rotational movement between the inner ring and the outer ring.

MODE FOR CARRYING OUT THE INVENTION

Figure 1:
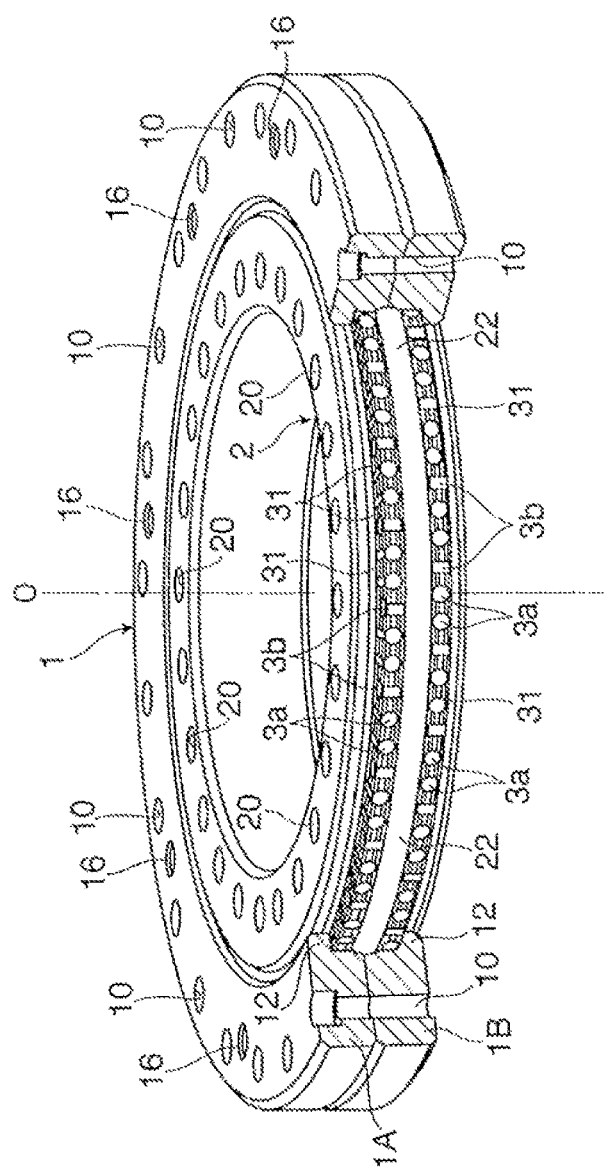
FIG. 1 is a perspective view for illustrating a double-row roller bearing according to a first embodiment, to which the present invention is applied.
Figure 2:
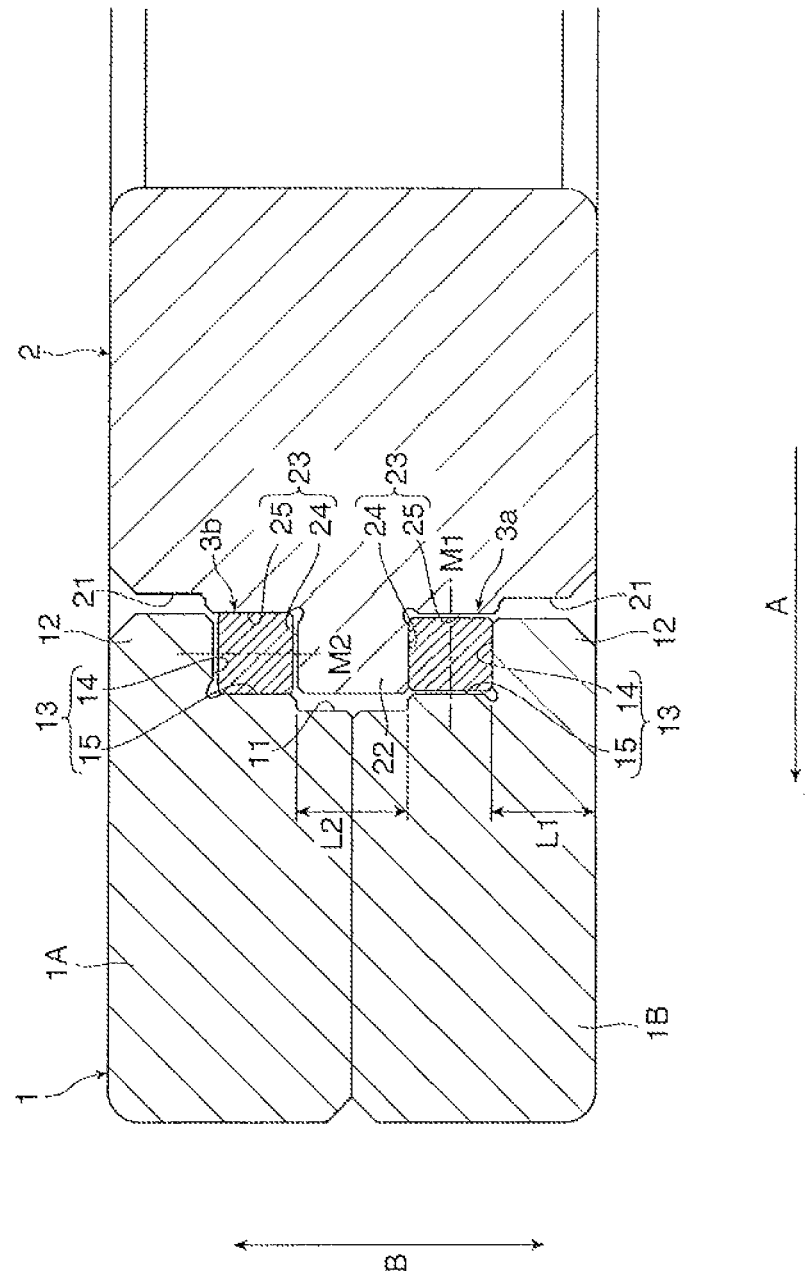
FIG. 2 is a sectional view taken along a radial direction of an outer ring and an inner ring.

FIG. 1 and FIG. 2 are respectively a perspective view and a sectional view for illustrating a double-row roller bearing according to a first embodiment, to which the present invention is applied. This double-row roller bearing includes an outer ring 1, an inner ring 2, and a large number of rollers 3 arrayed in two rows between the outer ring 1 and the inner ring 2, and the outer ring 1 and the inner ring 2 are combined with each other so as to be freely rotatable relative to each other along with rolling of the rollers 3. Note that, in FIG. 1, for the sake of better understanding of an internal structure of the double-row roller bearing, illustration of the outer ring 1 is partially cut out.

Bolt insertion holes 10 are formed through the outer ring 1 in a direction of a rotation axis O. The plurality of bolt insertion holes 10 are formed at equal intervals along a circumferential direction of the outer ring 1, and used at the time of fixing the outer ring 1 to a housing of, for example, a mechanical device.

Further, on an inner peripheral surface 11 of the outer ring 1 facing the inner ring 2, a pair of lateral protruding portions 12 are formed at an interval in the direction of the rotation axis O. The lateral protruding portions 12 are formed along the circumferential direction of the outer ring 1. At a portion between the pair of lateral protruding portions 12, a pair of outer raceway grooves 13 configured to allow the rollers 3 to roll therein are formed at an interval in the direction of the rotation axis O. The outer raceway grooves 13 are formed along the circumferential direction of the outer ring 1. Further, the outer raceway grooves 13 each have a first rolling surface 14 formed on an inner surface of the corresponding lateral protruding portion 12, and a second rolling surface 15 formed on the inner peripheral surface 11 of the outer ring 1 orthogonally to the first rolling surface 14. The outer raceway grooves 13 are each formed into an L-shape in cross-section taken along the direction of the rotation axis O of the outer ring 1. The first rolling surface 14 is formed perpendicularly to the rotation axis O of the outer ring 1 along the circumferential direction of the outer ring 1. Meanwhile, the second rolling surface 15 is formed so as to intersect at an angle of 90° with the corresponding first rolling surface 14 in parallel to the rotation axis O of the outer ring 1. Further, similarly to the first rolling surface 14, the second rolling surface 15 is formed along the circumferential direction of the outer ring 1.

The outer ring 1 constructed as described above is divided into an annular first half segment 1A and an annular second half segment 1B within a plane perpendicular to the rotation axis O of the outer ring 1. The division plane between the first half segment 1A and the second half segment 1B is defined between the pair of second rolling surfaces 15, and the first half segment 1A and the second half segment 1B are formed into the same shape. Further, the first half segment 1A and the second half segment 1B are assembled so as to face each other with fixing bolts 16. With this, the outer ring 1 is completed.

Meanwhile, bolt insertion holes 20 are formed through the inner ring 2 in the direction of the rotation axis O. Further, a single intermediate protruding portion 22 is formed on an outer peripheral surface 21 of the inner ring 2. The intermediate protruding portion 22 is formed along a circumferential direction of the inner ring 2. Still further, the intermediate protruding portion 22 is received between the pair of lateral protruding portions 12 formed along the outer ring 1, and both lateral surfaces of the intermediate protruding portion 22 face the inner surfaces of the lateral protruding portions 12, on which the first rolling surfaces 14 are formed. In addition, a thickness L2 of the intermediate protruding portion 22 along the rotation axis O is set substantially equal to a thickness L1 of each of the lateral protruding portions 12 of the outer ring 1 along the rotation axis O. Further, on the outer peripheral surface 21 of the inner ring 2, a pair of inner raceway grooves 23 are formed across the intermediate protruding portion 22. The inner raceway grooves 23 are formed along the circumferential direction of the inner ring 2, and face the outer raceway grooves 13 of the outer ring 1.

The inner raceway grooves 23 each have a first rolling surface 24 formed on each of the lateral surfaces of the intermediate protruding portion 22, and a second rolling surface 25 formed on the outer peripheral surface 21 of the inner ring 2 so as to intersect at 90° with the first rolling surface 24. The inner raceway grooves 23 are each formed into an L-shape in cross-section taken along the direction of the rotation axis O of the inner ring 2. The first rolling surfaces 24 are oriented opposite to each other, and formed perpendicularly to the rotation axis O of the inner ring 2. Further, under the state in which the outer ring 1 and the inner ring 2 are assembled to each other through intermediation of the rollers 3, the first rolling surfaces 24 respectively face the first rolling surfaces 14 of the outer ring 1.

Further, the second rolling surfaces 25 are formed across the intermediate protruding portion 22 in parallel to the rotation axis O of the inner ring 2. Further, under the state in which the outer ring 1 and the inner ring 2 are assembled to each other through intermediation of the rollers 3, the second rolling surfaces 25 respectively face the second rolling surfaces 15 of the outer ring 1.

In this way, the inner raceway grooves 23 of the inner ring 2 and the outer raceway grooves 13 of the outer ring 1 face each other so as to form roller rolling passages 30 configured to allow the rollers 3 to roll therein. The two outer raceway grooves 13 and the two inner raceway grooves 23 are formed respectively along the outer ring 1 and the inner ring 2. Thus, the two roller rolling passages 30 are formed between the outer ring 1 and the inner ring 2. Further, the outer raceway grooves 13 and the inner raceway grooves 23 are formed along the circumferential direction of each of the outer ring 1 and the inner ring 2. Thus, the roller rolling passages 30 are each formed into an annular shape about the rotation axis O.

Figure 3:
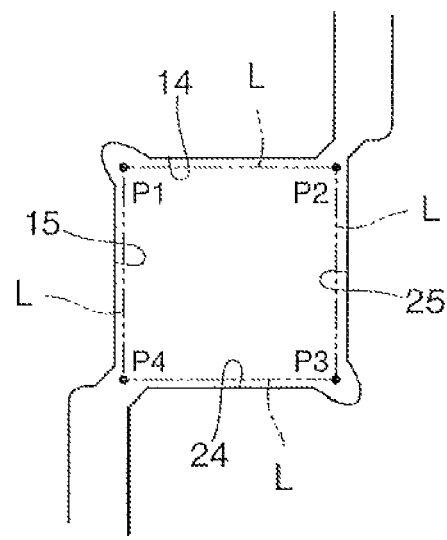
FIG. 3 is a sectional view for illustrating a roller rolling passage of the double-row roller bearing illustrated in FIG. 1.

FIG. 3 is a sectional view taken along a direction perpendicular to a circumferential direction of the roller rolling passage 30. As illustrated in FIG. 3, when intersections defined by extending the first rolling surfaces 14 and 24 and the second rolling surfaces 15 and 25, which form the roller rolling passage 30, are respectively represented by P1, P2, P3, and P4, four imaginary lines L each connecting adjacent intersections have the same length. A square shape is formed in the cross-section perpendicular to the circumferential direction of the roller rolling passage 30.

The plurality of rollers 3 are arrayed in the roller rolling passage 30 constructed as described above. When the outer ring 1 and the inner ring 2 are rotated relative to each other, the plurality of rollers 3 are revolved while turning on their axes in the roller rolling passage 30. In each of the roller rolling passages 30, there are arrayed first rollers 3a configured to roll while bearing loads between the first rolling surface 14 of the outer ring 1 and the first rolling surface 24 of the inner ring 2, and second rollers 3b configured to roll while bearing loads between the second rolling surface 15 of the outer ring 1 and the second rolling surface 25 of the inner ring 2. Detailed description of a ratio of the first rollers 3a and the second rollers 3b to be arrayed in each of the roller rolling passages 30 is made later.

The first rolling surfaces 14 of the outer ring 1 and the first rolling surfaces 24 of the inner ring 2 are formed perpendicularly to the rotation axis O of the inner ring and the outer ring. Thus, a turning axis M1 of the first roller 3a is orthogonal to the rotation axis O. Therefore, the first roller 3a bears an axial load to be applied in a direction parallel to the rotation axis O. Meanwhile, the second rolling surfaces 15 of the outer ring 1 and the second rolling surfaces 25 of the inner ring 2 are formed parallel to the rotation axis O of the inner ring and the outer ring. Thus, a turning axis M2 of the second roller 3b is parallel to the rotation axis O. Therefore, the second roller 3b bears a radial load to be applied in a direction orthogonal to the rotation axis O.

The first roller 3a and the second roller 3b are formed into the same shape, and lengths thereof in directions of the turning axes are set smaller than respective roller diameters. Thus, as illustrated in FIG. 2, both end surfaces of the first roller 3a in the direction of its turning axis face the second rolling surface 15 of the outer ring 1 and the second rolling surface 25 of the inner ring 2 across slight clearances. Meanwhile, both end surfaces of the second roller 3b in the direction of its turning axis face the first rolling surface 14 of the outer ring 1 and the first rolling surface 24 of the inner ring 2 across slight clearances.

Further, in the double-row roller bearing according to the first embodiment, as illustrated in FIG. 1, the first rollers 3a and the second rollers 3b are arranged in a mixed manner in each of the roller rolling passages 30. The number of the first rollers 3a received in each of the roller rolling passages 30 is set larger than that of the second rollers 3b. Specifically, the first rollers 3a and the second rollers 3b are assembled in each of the roller rolling passages at a ratio of 2:1.

The ratio of the first rollers 3a and the second rollers 3b to be arrayed in each of the roller rolling passages 30 can be changed as appropriate in accordance with loads to be applied to the double-row roller bearing. Specifically, under such a use environment that the axial loads to be applied are higher than the radial loads to be applied, it is preferred that a proportion of the received first rollers 3a be set higher than that of the received second rollers 3b. Further, the second rollers 3b and the first rollers 3a are arrayed at the same ratio in each of the roller rolling passages 30 in FIG. 1, but may be arrayed at different ratios in each of the roller rolling passages.

Note that, the reference symbols 31 in FIG. 1 denote spacers configured to prevent the rollers from coming into contact with each other. The spacers are arranged between the adjacent rollers 3. Those spacers 31 need not necessarily be arranged, and may be omitted. Further, although not shown in FIG. 1 and FIG. 2, in order to smoothly roll the rollers 3 in each of the roller rolling passages 30, a lubricant path configured to allow lubricant to be supplied therethrough into each of the roller rolling passages is formed in the outer ring 1 or the inner ring 2.

As described above, the double-row roller bearing to which the present invention is applied is used under a state in which any one of the outer ring and the inner ring is fixed to a stationary housing of, for example, a mechanical device, and another one of the outer ring and the inner ring is fixed to a rotary member having the rotation axis O. In this case, when relative rotational movement occurs between the inner ring and the outer ring, the rollers 3 roll in each of the raceway grooves 13 and 23, thereby generating frictional heat. As a result, temperatures of the outer ring 1 and the inner ring 2 are increased, and thermal expansion occurs in the outer ring 1 and the inner ring 2 in accordance with the temperature increase. At this time, increase in thickness of the inner ring 2 is significantly smaller than increase in outer diameter of the inner ring 2 because the thickness of the inner ring 2 is significantly smaller than a circumferential length of the inner ring 2.

Thus, in the double-row roller bearing according to the present invention, when the inner ring 2 is increased in temperature, the second rolling surfaces 25 formed parallel to the rotation axis O are displaced to an outer side in a radial direction of the inner ring 2 (direction of the arrow A in FIG. 2). Meanwhile, the first rolling surfaces 24 formed perpendicularly to the rotation axis O are displaced in the direction of the rotation axis O (direction of the arrow B in FIG. 2). However, an amount of the displacement of the first rolling surfaces 24 is significantly smaller than an amount of the displacement of the second rolling surfaces 25.

As described above, the second roller 3b rolls while bearing the load between the second rolling surface 15 of the outer ring 1 and the second rolling surface 25 of the inner ring 2. The second rolling surfaces 15 and 25 are formed parallel to the rotation axis O of the inner ring 2 and the outer ring 1. With this, the second roller 3b does not differentially slide at the time of rolling between the rolling surfaces 15 and 25. Thus, even when a force of press contact between the second roller 3b and the second rolling surfaces 15 and 25 is increased due to the displacement of the second rolling surface 25, the frictional heat to be generated between the second roller 3b and the second rolling surfaces 15 and 25 is not significantly increased. Meanwhile, the first roller 3a differentially slides at the time of rolling between the first rolling surface 14 of the outer ring 1 and the first rolling surface 24 of the inner ring 2. However, as described above, the displacement of the first rolling surface 24 due to the increase in temperature of the inner ring 2 is significantly small, and hence a variation in force of press contact between the first rolling surfaces 14 and 24 and the first roller 3a is significantly small. Thus, the frictional heat is not significantly increased even between the first rolling surfaces 14 and 24 and the first roller 3a.

In other words, in the double-row roller bearing according to this embodiment, even when the inner ring 2 is thermally expanded along with the relative rotation between the outer ring and the inner ring, generation of additional frictional heat between each of the inner ring 2 and the outer ring 1 and each of the rollers 3a and 3b due to the thermal expansion can be suppressed. As a result, additional thermal expansion of the inner ring 2 and the outer ring 1 can be prevented. Thus, the rollers 3 can be smoothly rolled in the roller rolling passages 30, thereby being capable of achieving smoother relative rotational movement between the outer ring 1 and the inner ring 2. Those actions and effects are exerted also when the double-row roller bearing is used under a state in which the housing is fixed to the inner peripheral surface of the inner ring 2, whereas the outer ring 1 is fixed to the rotary member.

Further, the length of the second roller 3b in the direction of its turning axis is set smaller than the roller diameter, and the end surfaces of the second roller 3b in the direction of the turning axis M2 face the first rolling surface 24 of the inner ring 2 and the first rolling surface 14 of the outer ring 1 across the slight clearances. Thus, even when the first rolling surface 24 is displaced along the direction of the rotation axis O of the inner ring 2 due to the thermal expansion of the inner ring 2, a force of press contact between the first rolling surfaces 14 and 24 and the second roller 3b can be prevented from being excessively increased. Meanwhile, the end surfaces of the first roller 3a in the direction of the turning axis M1 face the second rolling surface 25 of the inner ring 2 and the second rolling surface 15 of the outer ring 1 across the slight clearances. Thus, even when the second rolling surface 25 is displaced in the radial direction of the inner ring 2 due to the thermal expansion of the inner ring 2, a force of press contact between the second rolling surfaces 15 and 25 and the first roller 3a can be prevented from being excessively increased. In addition, the clearances formed between each of the raceway grooves 13 and 23 and each of the rollers 3a and 3b allow the lubricant to flow therein. With this, the inside of each of the roller rolling passages 30 can be appropriately lubricated.

Still further, in the double-row roller bearing to which the present invention is applied, the first rollers 3a configured to bear the axial loads and the second rollers 3b configured to bear the radial loads are arranged in a mixed manner in each of the roller rolling passages 30. Thus, the outer ring 1 and the inner ring 2 can be reduced in thickness as compared to those of such related-art double-row roller bearings that a roller rolling passage in which only the rollers configured to bear the axial loads are arrayed, and a roller rolling passage in which only the rollers configured to bear the radial loads are arrayed are formed independently of each other. In this way, the entire double-row roller bearing can be downsized.

Yet further, in the double-row roller bearing to which the present invention is applied, the first rollers 3a and the second rollers 3b are arranged in a mixed manner in each of the roller rolling passages 30, and the ratio of the first rollers 3a and the second rollers 3b to be arrayed in each of the roller rolling passages 30 can be changed as appropriate. With this, the double-row roller bearing can be constructed in accordance with use environment, and accordingly is higher in versatility than the related-art roller bearings.

Yet further, in the double-row roller bearing according to the first embodiment described above, the first rolling surfaces 14 are formed along the lateral protruding portions 12 of the outer ring 1, whereas the first rolling surfaces 24 are formed along the intermediate protruding portion 22 of the inner ring 2. With this, the axial loads are applied to each of the lateral protruding portions 12 and the intermediate protruding portion 22. In the double-row roller bearing according to this embodiment, the thickness L2 of the intermediate protruding portion 22 is set substantially equal to the thickness L1 of each of the lateral protruding portions 12. Thus, high rigidity of the entire double-row roller bearing is secured, thereby being capable of preventing damage to each of the lateral protruding portions 12 and the intermediate protruding portion 22.

Yet further, in the double-row roller bearing according to the first embodiment, the outer ring 1 is divided into the first half segment 1A and the second half segment 1B, and those half segments 1A and 1B are formed into the same shape. In other words, common components are used in the outer ring 1. In addition, the outer ring 1 is completed only by assembling the pair of half segments 1A and 1B with the fixing bolts 16, which facilitates the assembly.

Note that, in the double-row roller bearing according to this embodiment, the outer ring 1 includes the first half segment 1A and the second half segment 1B. However, the outer ring 1 need not necessarily be divided into the pair of half segments 1A and 1B, and may be integrally formed into an annular shape. In such a case, it is conceivable to form through-holes along a radial direction of the outer ring 1 so that the rollers 3 are inserted into each of the roller rolling passages through those through-holes.

Figure 4:
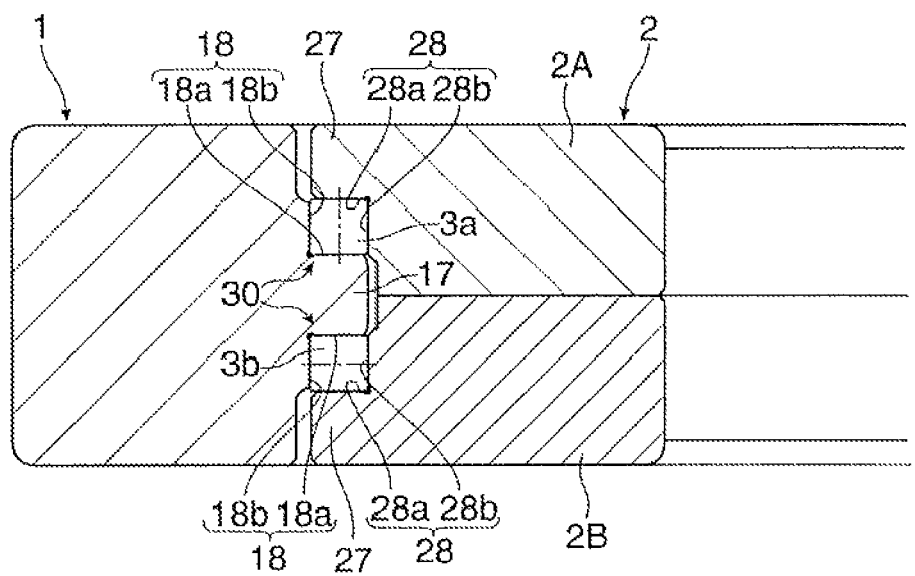
FIG. 4 is a main-part sectional view for illustrating a double-row roller bearing according to a second embodiment, to which the present invention is applied.

FIG. 4 is a sectional view taken along the radial direction of the outer ring and the inner ring similarly to FIG. 2 of the first embodiment described above, for illustrating a double-row roller bearing according to a second embodiment, to which the present invention is applied.

In the first embodiment described above, the pair of lateral protruding portions 12 is formed on the inner peripheral surface of the outer ring 1, whereas the intermediate protruding portion 22 is formed on the outer peripheral surface of the inner ring 2. In contrast, in the second embodiment, this relationship is inverted. Specifically, a pair of lateral protruding portions 27 is formed on the outer peripheral surface of the inner ring 2, whereas an intermediate protruding portion 17 positioned between those lateral protruding portions 27 is formed on the inner peripheral surface of the outer ring 1.

At a portion between the pair of lateral protruding portions 27 formed along the inner ring 2, a pair of inner raceway grooves 28 are formed at an interval in the direction of the rotation axis. The inner raceway grooves 28 each have a first rolling surface 28a formed on an inner surface of the corresponding lateral protruding portion 27, and a second rolling surface 28b formed on the outer peripheral surface of the inner ring 2 orthogonally to the first rolling surface 28a. The first rolling surfaces 28a are each formed perpendicularly to the rotation axis of the inner ring 2, whereas the second rolling surfaces 28b each intersect at an angle of 90° with the first rolling surface 28a. The inner raceway grooves 28 each having the first rolling surface 28a and the second rolling surface 28b are formed into a substantially L-shape in cross-section. Further, the inner raceway grooves 28 are formed along the circumferential direction of the inner ring 2 so as to surround the inner ring 2.

The inner ring 2 is divided into two, specifically, an annular first half segment 2A and an annular second half segment 2B within a plane perpendicular to the rotation axis of the inner ring. The division plane between the first half segment 2A and the second half segment 2B is defined between the pair of second rolling surfaces 28b, and the inner raceway groove 28 is formed along each of the first half segment 2A and the second half segment 2B. Further, the first half segment 2A and the second half segment 2B formed into the same shape are assembled so as to face each other. With this, the inner ring 2 is completed.

Meanwhile, the intermediate protruding portion 17 formed along the outer ring 1 is received between the pair of lateral protruding portions 27 formed along the inner ring 2, and partitions the two roller rolling passages 30. On the inner peripheral surface of the outer ring 1, a pair of outer raceway grooves 18 are formed across the intermediate protruding portion 17, and the outer raceway grooves 18 face the inner raceway grooves 28 of the inner ring 2.

The outer raceway grooves 18 each have a first rolling surface 18a formed on each of lateral surfaces of the intermediate protruding portion 17, and a second rolling surface 18b that intersects at 900 with the first rolling surface 18a. Further, the pair of first rolling surfaces 18a positioned on both the lateral surfaces of the intermediate protruding portion 17 are oriented opposite to each other, and formed perpendicularly to the rotation axis of the outer ring 1. The second rolling surfaces 18b are formed parallel to the rotation axis, and each intersect at an angle of 90° with the first rolling surface 18a. The outer raceway grooves 18 each having the first rolling surface 18a and the second rolling surface 18b are each formed into a substantially L-shape in cross-section. Further, under the state in which the outer ring 1 and the inner ring 2 are assembled to each other through intermediation of the rollers 3, the first rolling surfaces 18a on the outer ring 1 side face the first rolling surfaces 28a on the inner ring 2 side. With this, the two roller rolling passages 30 are formed between the inner ring 2 and the outer ring 1.

Still further, also in the double-row roller bearing according to the second embodiment, the first rollers 3a configured to bear the axial loads and the second rollers 3b configured to bear the radial loads are arranged in a mixed manner in each of the roller rolling passages 30. Specifically, the first rollers 3a bear only the axial loads between the first rolling surfaces 28a formed along the lateral protruding portions 27 of the inner ring 2 and the first rolling surfaces 18a formed along the intermediate protruding portion 17 of the outer ring 1. Meanwhile, the second rollers 3b bear only the radial loads between the second rolling surfaces 28b formed on the outer peripheral surface of the inner ring 2 and the second rolling surfaces 18b formed on the inner peripheral surface of the outer ring 1.

As described in the first embodiment, the double-row roller bearing of this type is used under the state in which any one of the outer ring 1 and the inner ring 2 is mounted to the stationary housing, and the another one of the outer ring 1 and the inner ring 2 is mounted to the rotary member. In general, the stationary housing is larger in mass than the rotary member, and accordingly is higher in heat capacity. Thus, even when the frictional heat generated by the rolling of the rollers 3a and 3b is transferred evenly to both the outer ring 1 and the inner ring 2, in a case where the double-row roller bearing is used in such a manner that the outer ring 1 is fixed and the inner ring 2 is rotated, the heat is more liable to be accumulated in the inner ring 2 than in the outer ring 1. Thus, the temperature of the inner ring 2 tends to be increased more than the outer ring 1. Further, the inner ring 2 is smaller in inner diameter than the outer ring 1, and accordingly is low in heat capacity and small in heat radiation area. Thus, the inner ring 2 is liable to be higher in temperature than the outer ring 1.

In the first embodiment described above, the increase in thickness of the inner ring 2 in accordance with the temperature increase is small. However, when the double-row roller bearing is used under the state in which the inner ring 2 is mounted to the rotary member, the temperature of the inner ring 2 may be conspicuously increased. For this reason, the increase in thickness of the inner ring 2 in accordance therewith needs to be taken into consideration. Thus, when the double-row roller bearing of the present invention is used under the state in which the inner ring 2 is mounted to the rotary member, it is preferred that, as illustrated in FIG. 4, the pair of lateral protruding portions 27 be formed along the inner ring 2, and the intermediate protruding portion 17 be formed along the outer ring 1. In a case where the temperature of the inner ring 2 is increased more than the outer ring 1, when the pair of lateral protruding portions 27 is formed along the inner ring 2 in this way, an amount of widening an interval between the lateral protruding portions 27 due to the thermal expansion is larger than an amount of increasing a thickness of the intermediate protruding portion 17 formed along the outer ring 1. Thus, even when the inner ring is thermally expanded due to the frictional heat generated by the rolling of the rollers 3a and 3b, a force of press contact between each of the first rollers 3a bearing the axial load while differentially sliding and the first rolling surfaces 18a and 28a of the outer ring 1 and the inner ring 2 is not excessively increased. With this, the rollers 3 can be smoothly rolled in the roller rolling passages 30, thereby being capable of achieving smoother relative rotational movement between the outer ring 1 and the inner ring 2.

Note that, the double-row roller bearing according to the second embodiment illustrated in FIG. 4 is a preferred example of the case where the double-row roller bearing is used under the state in which the inner ring 2 is mounted to the rotary member. However, even when the double-row roller bearing is used under a state in which the outer ring 1 is mounted to the rotary member, the double-row roller bearing can be used satisfactorily.

Figure 5:
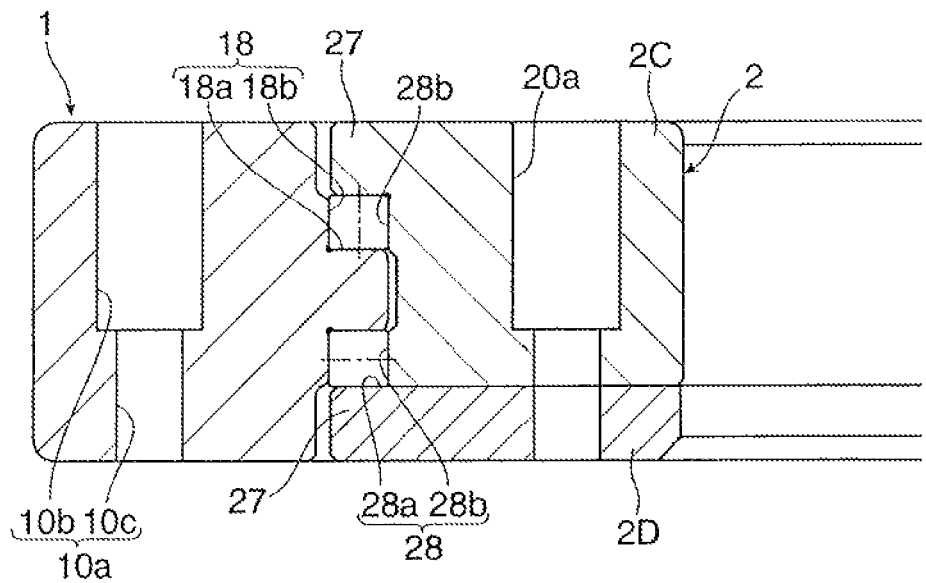
FIG. 5 is a main-part sectional view for illustrating a double-row roller bearing according to a third embodiment, to which the present invention is applied.

FIG. 5 is a sectional view taken along the radial direction of the outer ring 1 and the inner ring 2 similarly to FIG. 4 of the second embodiment described above, for illustrating a double-row roller bearing according to a third embodiment, to which the present invention is applied.

In the second embodiment described above, the inner ring 2 is divided into the first half segment 2A and the second half segment 2B having the same shape, and the inner raceway groove 28 is formed along each of the first half segment 2A and the second half segment 2B. However, in the double-row roller bearing according to the third embodiment, the inner ring 2 is divided into a main plate 2C and a closing plate 2D, and the closing plate 2D is formed into a disc shape having a thickness equal to an axial length of the lateral protruding portion 27. Thus, of the pair of the inner raceway grooves 28 of the inner ring 2, one of the inner raceway grooves 28 is formed across the main plate 2C and the closing plate 2D, specifically, the first rolling surface 28a is formed on the closing plate 2D, and the second rolling surface 28b is formed on the main plate 2C.

Further, in the double-row roller bearing according to the third embodiment, each of the pair of the second rolling surfaces 28b of the inner ring 2 is formed on an outer peripheral surface of the main plate 2C. Thus, the pair of second rolling surfaces 28b can be machined at the same time on the main plate 2C. With this, the two inner raceway grooves 28 can be formed with high accuracy along the inner ring 2.

Further, bolt insertion holes 10a configured to allow the outer ring 1 to be fastened to the stationary housing are formed at equal intervals along the circumferential direction of the outer ring 1. The bolt insertion holes 10a each include a large diameter portion 10b configured to receive a head portion of the fixing bolt, and a small diameter portion 10c configured to allow a threaded portion of the fixing bolt to pass therethrough. An axial length of the large diameter portion 10b is set larger than an axial length of the small diameter portion. With this, the outer ring 1 can be suppressed from being deformed into a corrugated shape due to fastening with the fixing bolts.

Bolt insertion holes 20a are formed also at equal intervals along the circumferential direction of the inner ring 2, and the bolt insertion holes 20a are formed into the same shape as the bolt insertion holes 10a of the outer ring 1. Further, the shape of the bolt insertion holes is applicable not only to the double-row roller bearing according to the third embodiment, but also to the double-row roller bearing according to the first embodiment or the second embodiment described above.

Note that, in FIG. 5, the components of the double-row roller bearing according to the third embodiment that are common to those in the second embodiment are denoted by the same reference symbols as those in the second embodiment, and detailed description of those components is omitted.

Figure 6:
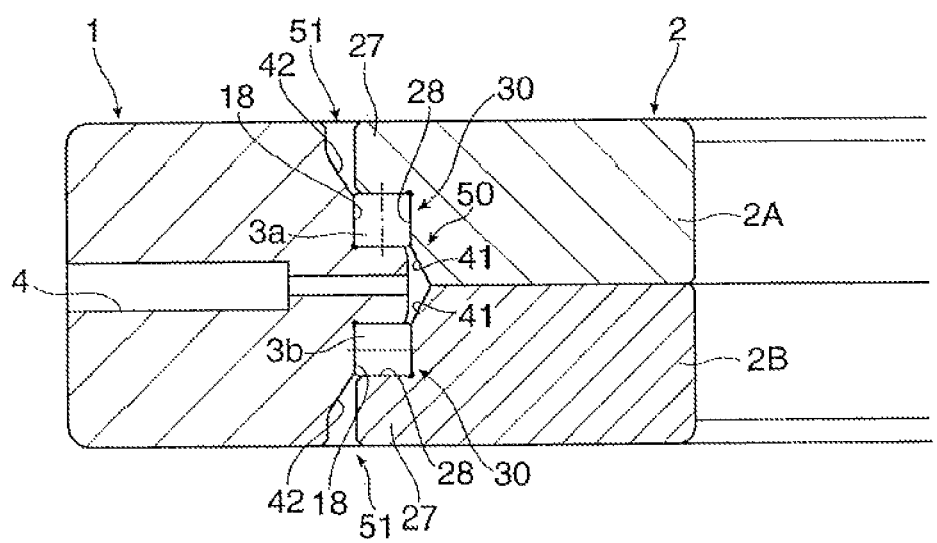
FIG. 6 is a main-part sectional view for illustrating a double-row roller bearing according to a fourth embodiment, to which the present invention is applied.

Next, FIG. 6 is a view for illustrating a double-row roller bearing according to a fourth embodiment of the present invention, for illustrating a specific example of a supply path for the lubricant. Note that, the structures of the outer ring 1 and the inner ring 2 in the fourth embodiment are substantially the same as those in the second embodiment described above. Thus, in FIG. 6, the same components are denoted by the same reference symbols as those in the second embodiment, and detailed description thereof is omitted herein.

In the double-row roller bearing according to the fourth embodiment, a supply hole 4 for the lubricant is formed through the outer ring 1 along its radial direction. Depending on the diameter of the outer ring 1, the supply hole 4 for the lubricant may be formed at one position or at a plurality of positions on a circumference of the outer ring 1. A distal end of the supply hole 4 is opened at a portion between the two roller rolling passages 30, that is, at a center of the intermediate protruding portion 17 of the outer ring 1 to communicate to a central clearance 50 positioned between the pair of roller rolling passages 30.

On the outer peripheral surface of the inner ring 2, which faces the supply hole 4, a pair of lubricant transfer surfaces 41 is formed. The lubricant transfer surfaces 41 are inclined in directions different from each other with respect to the rotation axis of the inner ring 2. Each of the lubricant transfer surfaces 41 is formed along the circumferential direction of the inner ring 2 so as to surround the inner ring 2. Further, the central clearance 50 is formed into a substantially triangular shape in cross-section through combination of the pair of lubricant transfer surfaces 41. In addition, ends of the lubricant transfer surfaces 41 on one side are continuous with the inner raceway grooves 28, and a joint between the pair of lubricant transfer surfaces 41, that is, the part facing the supply hole 4 is positioned on an inner side in the radial direction of the inner ring 2 with respect to the inner raceway grooves 28.

Meanwhile, a pair of lateral clearances 51 is formed between the lateral protruding portions 27 of the inner ring 2 and the inner peripheral surface of the outer ring 1. The lateral clearances 51 are adjacent to the roller rolling passages 30 and continuous with the central clearance 50 through the roller rolling passages 30. Further, the intermediate protruding portion 17 formed along the outer ring 1 enters between the pair of lateral protruding portions 27 formed along the inner ring 2. Thus, the lateral clearances 51 are positioned on the outer side in the radial direction of each of the inner ring 2 and the outer ring 1 with respect to the central clearance 50.

Along the outer ring 1, a pair of lubricant discharge surfaces 42 inclined with respect to the axial direction of the outer ring 1 are formed at positions facing the lateral protruding portions 27 of the inner ring 2. The lubricant discharge surfaces 42 are formed along the circumferential direction of the outer ring 1. Further, ends of the lubricant discharge surfaces 42 on one side are continuous with the outer raceway grooves 18, and ends of the lubricant discharge surfaces 42 on another side are positioned on the outer side in the radial direction of the outer ring 1 with respect to the outer raceway grooves 18. In other words, the lateral clearances 51 formed between the lubricant discharge surfaces 42 and the lateral protruding portions 27 of the inner ring 2 are gradually increased in size as being shifted away the roller rolling passages 30.

For example, a pressure pump is connected to the supply hole 4 so that pressurized air containing atomized lubricating oil is supplied as the lubricant. The lubricating oil atomized into fine droplets flows through the supply hole 4 in the outer ring 1 together with the pressurized air to be supplied into the central clearance 50 formed between the intermediate protruding portion 17 of the outer ring 1 and the outer peripheral surface of the inner ring 2. The first rollers 3a and the second rollers 3b are arrayed in the roller rolling passages adjacent to the central clearance 50, and the slight clearances are formed between the end surfaces of the rollers 3a and 3b and the outer and inner raceway grooves. Thus, the pressurized air supplied to the central clearance 50 flows into the lateral clearances 51 through the roller rolling passages 30. At this time, the fine droplets of the lubricating oil contained in the pressurized air adhere to the outer raceway grooves 18 of the outer ring 1, the inner raceway grooves 28 of the inner ring 2, and the rollers 3a and 3b, to thereby lubricate those parts. Further, the pressurized air flows through the roller rolling passages 30, to thereby cool the rollers 3a and 3b, and the inner raceway grooves 28 and the outer raceway grooves 18 in which those rollers are caused to roll. Then, the pressurized air having flowed through the roller rolling passages 30 is discharged to an outside of the bearing through the lateral clearances 51.

Such flow of the lubricant from the central clearance 50 to the lateral clearances 51 through the roller rolling passages 30 is generated solely by supplying the pressurized air into the central clearance 50. However, even when a pressurizing amount is small, at the time of the rotation of the inner ring 2 or the outer ring 1, air flow can be forcibly generated by utilizing a centrifugal force. This is because the lateral clearances 51 are positioned on the outer side in the radial direction of each of the inner ring 2 and the outer ring 1 with respect to the central clearance 50. Specifically, when the inner ring 2 or the outer ring 1 is rotated to cause the rollers 3a and 3b to roll in the roller rolling passages 30, air in the roller rolling passages 30 is pressurized by the centrifugal force toward the outer side in the radial direction of the inner ring 2. Thus, the air in the roller rolling passages 30 is forced out to the lateral clearances, whereas the air in the central clearance 50 is sucked into the roller rolling passages 30. Through a sequence of those processes, the air flow from the central clearance 50 to the lateral clearances 51 is forcibly generated.

In this way, through the supply of the air containing the lubricating oil into the supply hole 4, the air flow to pass through the roller rolling passages 30 can be forcibly generated along with the rotation of the bearing. With this, the rollers 3a and 3b configured to roll in the roller rolling passages 30 can be reliably lubricated.

Further, when the pressurized air containing the atomized lubricating oil is supplied into the central clearance 50 through the supply hole 4, the fine droplets of the lubricating oil contained in the pressurized air partially adhere to the outer peripheral surface of the inner ring 2, which faces the supply hole 4, that is, adhere to the lubricant transfer surfaces 41. On a premise that the double-row roller bearing is used under the state in which the inner ring 2 is mounted to the rotary member, the inner ring 2 is rotated in conjunction with the rotary member, and hence the centrifugal force is applied to the lubricating oil adhering to the lubricant transfer surfaces 41. The lubricant transfer surfaces 41 are inclined with respect to the rotation axis of the inner ring 2, and the part facing the supply hole 4 is positioned on an innermost side in the radial direction of the inner ring 2. With this, when the centrifugal force is applied to the lubricating oil adhering to the lubricant transfer surfaces 41, the lubricating oil is moved on the lubricant transfer surfaces 41 toward the inner raceway grooves 28. In this way, the lubricating oil adheres to the first rollers 3a and the second rollers 3b configured to roll in the roller rolling passages 30, thereby reliably lubricating those rollers 3a and 3b.

Meanwhile, the centrifugal force toward the outer side in the radial direction of the outer ring 1 is applied to the lubricating oil adhering to the rollers 3a and 3b. Thus, the lubricating oil adhering to the rollers 3a and 3b is moved to the lubricant discharge surfaces 42 of the outer ring 1 through the outer raceway grooves 18 continuous therewith. In this way, the lubricating oil adheres to the lubricant discharge surfaces 42 of the outer ring 1. The outer ring 1 is mounted to the stationary housing, and hence no centrifugal force is applied to the lubricating oil adhering to the lubricant discharge surfaces 42. However, as described above, the pressurized air is blown into the lateral clearances 51 through the roller rolling passages 30, and in addition, the lubricant discharge surfaces 42 are inclined with respect to the axial direction of the outer ring 1. Thus, the lubricating oil is moved away from the roller rolling passages 30 on the lubricant discharge surfaces 42 by the flow of the pressurized air. In other words, the lubricating oil is discharged to the outside of the bearing through the lateral clearances 51.

The flow of the lubricating oil is described above on the premise that the double-row roller bearing is used while rotating the inner ring 2. However, the lubricating oil flows in the same way as in the case where the double-row roller bearing is used while rotating the outer ring 1. Specifically, when the double-row roller bearing is used while rotating the outer ring 1, the centrifugal force is not applied to the lubricating oil adhering to the lubricant transfer surfaces 41 in the central clearance 50. However, the pressurized air is blown toward the roller rolling passages 30 through the central clearance 50. Thus, the lubricating oil adhering to the lubricant transfer surfaces 41 flows into the inner raceway grooves 28 while being guided by the flow of the pressurized air.

Further, when the outer ring 1 is rotated, the centrifugal force is applied to the lubricating oil adhering to the lubricant discharge surfaces 42. Thus, the lubricating oil discharged through the roller rolling passages 30 to adhere to the lubricant discharge surfaces 42 is moved by the centrifugal force on the lubricant discharge surfaces 42 inclined with respect to the rotation axis of the outer ring 1. Also in this case, the lubricating oil is discharged to the outside of the bearing.

In other words, in the double-row roller bearing described in the fourth embodiment, the centrifugal force to be applied along with the rotation of the inner ring 2 or the outer ring 1, and the flow of the pressurized air are utilized. With this, the lubricating oil is actively supplied from an upstream side of the roller rolling passages 30 and discharged from a downstream side thereof. As a result, along with the rotation of the inner ring 2 or the outer ring 1, the lubricant is efficiently supplied to the rollers 3a and 3b.

Figure 7:
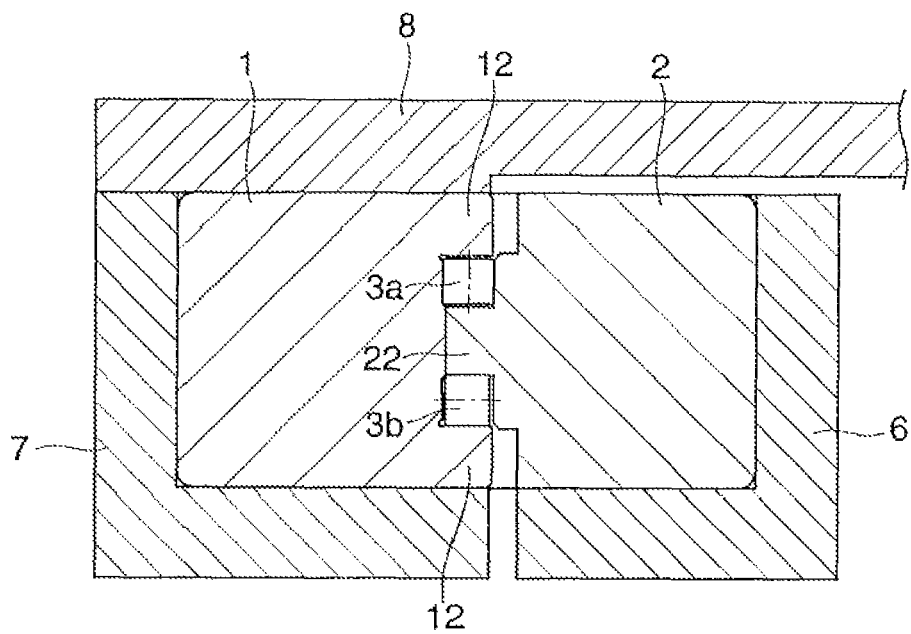
FIG. 7 is a sectional view for illustrating an example of a mounting structure in a case where the double-row roller bearing to which the present invention is applied is used in such a manner that the outer ring is rotated and the inner ring is fixed.
Figure 8:
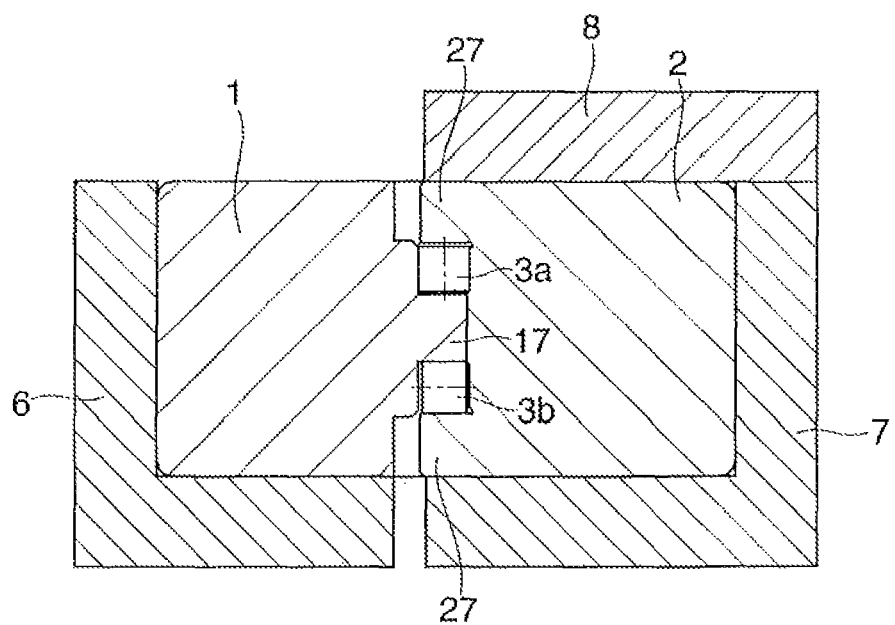
FIG. 8 is a sectional view for illustrating an example of a mounting structure in a case where the double-row roller bearing to which the present invention is applied is used in such a manner that the inner ring is rotated and the outer ring is fixed.

FIG. 7 and FIG. 8 are each a view for illustrating a structure of mounting the double-row roller bearing according to the present invention, for example, to a mechanical device. In the case illustrated in FIG. 7, the lateral protruding portions are formed along the outer ring as in the first embodiment described above. Meanwhile, in the case illustrated in FIG. 8, the lateral protruding portions are formed along the inner ring as in the second embodiment described above.

The axial loads are applied from the first rollers 3a to the lateral protruding portions, and hence the lateral protruding portions need to have sufficient rigidity. However, when the thickness of each of the lateral protruding portions is set large in the axial direction of the bearing, a thickness of the double-row roller bearing itself is increased in the axial direction. As a result, the bearing is difficult to reduce in size and thickness. Thus, in order to sufficiently secure the rigidity of the lateral protruding portions while minimizing the thickness of each of the lateral protruding portions in the axial direction, it is preferred that, at the time of mounting the double-row roller bearing according to the present invention to a mechanical device, the lateral protruding portions be covered with a member on the mechanical device side.

FIG. 7 is an illustration of an example in which the outer ring 1 including the lateral protruding portions 12 is mounted to a rotary member. The inner ring 2 is mounted to a stationary housing 6, whereas the outer ring 1 is mounted to the rotary member such as a drive shaft. In this case, the outer ring 1 is sandwiched by a drive shaft 7 and a rotary table 8. The drive shaft 7 and the rotary table 8 sandwich the outer ring 1 including the lateral protruding portions 12.

Further, FIG. 8 is an illustration of an example in which the inner ring 2 including the lateral protruding portions 27 is mounted to the rotary member. The outer ring 1 is mounted to the stationary housing 6, whereas the inner ring 2 is mounted to the rotary member such as the drive shaft. In this case, the inner ring 2 is sandwiched by the drive shaft 7 and the rotary table 8. The drive shaft 7 and the rotary table 8 sandwich the inner ring 2 including the lateral protruding portions 27.

In those mounting structures, even when the thickness of each of the lateral protruding portions 12 and 27 is minimized so as to reduce the double-row roller bearing in size and thickness, the drive shaft 7 and the rotary table 8 cover the lateral protruding portions 12 and 27 from the outside in the axial direction. Thus, the drive shaft 7 and the rotary table 8 function as reinforcing members for the lateral protruding portions 12 and 27. With this, the double-row roller bearing can be reduced in size and thickness, and in addition, the sufficient rigidity can be provided to the lateral protruding portions 12 and 27.

The invention claimed is:

1. A double-row roller bearing, comprising:
   an inner ring;
   an outer ring;
   a plurality of rollers arranged between the inner ring and the outer ring,
   wherein one of an inner peripheral surface of the outer ring and an outer peripheral surface of the inner ring includes a pair of lateral protruding portions continuous along a circumferential direction which are formed at an interval in a direction of a rotation axis,
   wherein the other of the inner peripheral surface of the outer ring and the outer peripheral surface of the inner ring includes an intermediate protruding portion continuous along the circumferential direction, which is formed so as to be positioned between the pair of lateral protruding portions,
   wherein the pair of lateral protruding portions and the intermediate protruding portion positioned between the pair of lateral protruding portions define a pair of roller rolling passages between the outer ring and the inner ring,
   wherein the intermediate protruding portion and the pair of lateral protruding portion are formed so as to have the same thickness,
   wherein both lateral surfaces of the intermediate protruding portion and inner surfaces of the pair of lateral protruding portions, which face both the lateral surfaces of the intermediate protruding portion, comprise pairs of first rolling surfaces formed perpendicularly to the rotation axis of the outer ring and the inner ring,
   wherein the inner peripheral surface of the outer ring and the outer peripheral surface of the inner ring comprise pairs of second rolling surfaces formed in parallel to the rotation axis so as to intersect with the pairs of first rolling surfaces,
   wherein, respectively along the outer ring and the inner ring, the pairs of first rolling surfaces and the pairs of second rolling surfaces define pairs of raceway grooves each having an L-shape in cross-section and facing each other to form the pair of roller rolling passages,
   wherein the pairs of second rolling surfaces of the inner ring is positioned equidistant from the rotation axis of the inner ring,
   wherein four imaginary lines connecting four imaginary intersections defined by extending the pairs of first rolling surfaces and the pairs of second rolling surfaces, which surround the pair of roller rolling passages, have the same length,
   wherein the pair of roller rolling passages each have a square shape in cross-section perpendicular to the circumferential direction, and
   wherein the plurality of rollers comprise:
      first rollers configured to roll on the pairs of first rolling surfaces; and
      second rollers having the same shape as a shape of the first rollers and configured to roll on the pairs of second rolling surfaces,
      the first rollers and the second rollers being arranged in a mixed manner in each of the pair of roller rolling passages.

2. The double-row roller bearing according to claim 1, wherein the inner ring or the outer ring, which comprises the pair of lateral protruding portions, comprises a pair of first half segment and second half segment having the same shape, which are combined with each other, and
   wherein the pair of lateral protruding portions, the pair of first rolling surfaces, and the pair of second rolling surfaces are provided to the pair of first half segment and second half segment.

3. The double-row roller bearing according to claim 1, wherein the inner ring or the outer ring, which comprises the pair of lateral protruding portions, comprises a main plate and a closing plate combined with each other,
   wherein the closing plate comprises one of the pair of lateral protruding portions, and has a thickness set equal to an axial length of the one of the pair of lateral protruding portions, and
   wherein the pair of second rolling surfaces of the inner ring is formed along the main plate.

4. A method of using the double-row roller bearing of claim 1, the method comprising:
   mounting one of the inner ring and the outer ring, which has the pair of lateral protruding portions formed thereon, to a rotary member; and
   mounting another one of the inner ring and the outer ring, which has the intermediate protruding portion formed thereon, to a stationary housing.

5. A double-row roller bearing, comprising:
an inner ring;
an outer ring; and
a plurality of rollers arranged between the inner ring and the outer ring,
wherein, on an outer peripheral surface of the inner ring, the inner ring comprises a pair of lateral protruding portions continuous along a circumferential direction of the inner ring, which are formed at an interval in a direction of a rotation axis of the inner ring,
wherein, on an inner peripheral surface of the outer ring, the outer ring comprises an intermediate protruding portion continuous along the circumferential direction, which is formed so as to be positioned between the pair of lateral protruding portions,
wherein the pair of lateral protruding portions and the intermediate protruding portion positioned between the pair of lateral protruding portions define a pair of roller rolling passages between the outer ring and the inner ring,
wherein both lateral surfaces of the intermediate protruding portion and inner surfaces of the pair of lateral protruding portions, which face both the lateral surfaces of the intermediate protruding portion, comprise pairs of first rolling surfaces formed perpendicularly to the rotation axis of the outer ring and the inner ring,
wherein the inner peripheral surface of the outer ring and the outer peripheral surface of the inner ring comprise pairs of second rolling surfaces formed in parallel to the rotation axis so as to intersect with the pairs of first rolling surfaces,
wherein, respectively along the outer ring and the inner ring, the pairs of first rolling surfaces and the pairs of second rolling surfaces define pairs of raceway grooves each having an L-shape in cross-section and facing each other to form the pair of roller rolling passages,
wherein the pair of roller rolling passages each have a square shape in cross-section perpendicular to the circumferential direction,
wherein the plurality of rollers comprise:
   first rollers configured to roll on the pairs of first rolling surfaces; and
   second rollers having the same shape as a shape of the first rollers and configured to roll on the pairs of second rolling surfaces,
   the first rollers and the second rollers being arranged in a mixed manner in each of the pair of roller rolling passages,
wherein the double-row roller bearing has a central clearance formed between the outer peripheral surface of the inner ring and the intermediate protruding portion of the outer ring, and lateral clearances formed between the inner peripheral surface of the outer ring and the pair of lateral protruding portions of the inner ring,
wherein the central clearance is arranged on an inner side in a radial direction of the inner ring with respect to the lateral clearances,
wherein the outer peripheral surface of the inner ring, which faces the central clearance, comprises a pair of lubricant transfer surfaces being inclined with respect to the rotation axis of the inner ring and being continuous with the pair of second rolling surfaces, and
wherein the outer ring has a supply hole configured to allow lubricant to be supplied into the central clearance.

6. A method of using the double-row roller bearing of claim 5, the method comprising:
   mounting one of the inner ring and the outer ring, which has the pair of lateral protruding portions formed thereon, to a rotary member; and
   mounting another one of the inner ring and the outer ring, which has the intermediate protruding portion formed thereon, to a stationary housing.

7. A double-row roller bearing according to claim 5, wherein the inner peripheral surface of the outer ring, which faces the lateral clearances, comprises lubricant discharge surfaces being inclined with respect to a rotation axis of the outer ring and being continuous with the pair of second rolling surfaces.

* * * * *